United States Patent [19]
Prellwitz

[11] Patent Number: 5,974,776
[45] Date of Patent: Nov. 2, 1999

[54] CHOPPER FOR HARVESTING MACHINE

[75] Inventor: Hubert Prellwitz, OT Polenz, Germany

[73] Assignee: Case Harvesting Systems GmbH, Neustadt, Germany

[21] Appl. No.: 09/024,989

[22] Filed: Feb. 17, 1998

[30] Foreign Application Priority Data

Feb. 19, 1997 [DE] Germany .............................. 19706429

[51] Int. Cl.⁶ ........................... A01D 50/02; A01F 12/40
[52] U.S. Cl. ............................................. 56/504; 460/112
[58] Field of Search .................................. 56/121.4, 229,
56/503, 504, 505, 14–6, 12.7, 16.4 R; 460/78,
112; 241/101.742, 101.2, 186.3

[56] References Cited

U.S. PATENT DOCUMENTS

| 3,794,046 | 2/1974 | Muijs ........................................ 56/14.6 |
| 5,052,170 | 10/1991 | Trenkamp et al. ........................ 56/341 |

FOREIGN PATENT DOCUMENTS

| 32 13 199 | 3/1983 | Germany . |
| 31 41 414 | 6/1983 | Germany . |
| 36 44 884 | 11/1987 | Germany . |
| 36 17 013 | 1/1988 | Germany . |
| 43 02 199 | 7/1994 | Germany . |

*Primary Examiner*—Robert E. Pezzuto
*Attorney, Agent, or Firm*—Herbert Dubno; Andrew Wilford

[57] ABSTRACT

A crop chopper for an agricultural machine has a rotor having a plurality of fingers displaceable on rotation of the rotor along the passage, and respective blades interleaved with the fingers and each having a front end pivoted about a horizontal axis and a rear edge formed with a rearwardly open notch so that crop pressed by the fingers between the blades is chopped and moved rearward along the passage. A rocker is pivotal about a horizontal axis and respective actuator plates juxtaposed with the rear edges of the blades are each formed with a rearwardly projecting arm. Respective abutment bodies on the plates are displaceable toward and away from the respective blades and respective springs braced between the bodies and the respective plates urge the bodies forward toward the blades. The plates are each pivotal about a horizontal axis between an active position with the respective body engaged against the respective rear edge and an inactive position with the respective body disengaged from the respective rear edge. Respective springs braced between the plates and the rocker pivot the plates on the rocker about the respective plate axis in a direction pulling the bodies away from the blades and pivot the blade arms downward. An abutment beam extends below the plates, and at least one actuator engaged with the rocker can pivot down the rocker and thereby press the rear arms against the abutment beam and bring the plates into the active positions.

9 Claims, 7 Drawing Sheets

5,974,776

CHOPPER FOR HARVESTING MACHINE

FIELD OF THE INVENTION

The present invention relates to a harvesting machine. More particularly this invention concerns a crop chopper for an ensilage maker, thresher, combine, or the like.

BACKGROUND OF THE INVENTION

Various agricultural machines, for instance combines and balers, have choppers that cut the harvested crop, e.g. alfalfa or corn, into short pieces suitable for baling, use as ensilage, or even tedding back on the field. For some applications a chopped length of 4 cm to 5 cm is needed, for others half this length is desired. Often the same machine is used so systems must be provided to change the output chop length.

German patent document 3,141,414 of W. Silber describes such a chopper wherein the change of the chop length to preset values is effected by swinging individual or all the cutting blades from the active cutting position to an inactive position. The aligned blades are controlled by respective centrally pivoted levers pivoted on an axis fixed on the chopper's frame. These levers can hold the blades in the cutting position and can be swung back against a spring force to inactive positions in which they do not support the blades so that they can swing back of their own weight into their inactive positions. Normally even if the blades do not move by gravity, the force of the crop being pushed through the crop passage through the chopper will force the blades back. The device that controls blade position has a control shaft pivotal behind the blades about an axis parallel to that of the blades and having a plurality of cams engageable with the blade-actuating levers. The cams are differently shaped along the control shaft so that in different angular positions of the control shaft different cams act differently on the levers, with selected blades being active depending on setting. In an end position all the levers are positioned to allow the respective blades to move into the inactive positions, allowing the crop to pass through the chopper without being chopped.

The disadvantage of this system is that a separate relatively powerful drive must be provided for rotating the control shaft and its cams. Furthermore once released, the levers snap violently into the inactive or retracted position which can damage the structure. It has been proposed to provide a brake or damper for each lever to ease it into its inactive position, but such extra structure unnecessarily complicates and increases the cost of the chopper. Furthermore the mechanism is exposed to the crop and, due to its complexity, gets jammed easily so that even when released, some of the levers and/or blades remain in their active positions.

In German patent document 3,213,199 of B. Krone a chopper is described wherein the control system can set the blades directly in different positions in different arrays to produce different chop lengths. To this end support claws mounted on the selector shaft support the blades and are set parallel to the control shaft with a plurality of different support surfaces. When the shaft is rotated different support claws engage the blades to push them into different positions against the force of respective tension springs. With this system all the blades must be adjusted together, not just a few of them. Furthermore the supports for the blades are subjected to considerable stress during chopping so that the response to different forces is not clearly defined.

German patent documents 3,617,013 of K. Edlbauer and 3,644,884 of W. Lippi describe another system where each blade is pivoted at its front end on a frame of the machine and at its rear end by a coil spring set up as a toggle. Thus each spring is pivoted at one end on the respective blade and at its opposite end in a support which can be fixed on the frame of the chopper or connected via a link with a pivotal control shaft. In the latter case the number of active blades can be changed. In addition the entire frame of the chopper can be pivoted by heavy-duty hydraulic rams to set all the blades in the inactive position.

This system has several disadvantages. It is possible that, when pivoting some or all of the blades into the inactive position, the springs and blades are held in position by crop jammed into the mechanism. Thus the blades are left projecting at least partially into the feed passage-where they will cut the crop. Furthermore as a result of the relatively large coil springs the system is quite bulky and the springs in effect form a wall behind the blades that can be packed with cut crop that prevents the mechanism from functioning and makes servicing the machine, for instance to change blades, very difficult.

Finally, German patent 4,302,199 of G. Clostermeyer has a system with a plurality of vertically pivotal blades movable into an active position. They are held in the active position by support elements and are all or selectively movable into inactive positions. To this end each support element is formed by a control shaft with an end contact point engaged in the respective blade. All the control shafts are shiftable via a transverse linkage by means of a spring so that the transverse connection is formed by at least one hydraulic cylinder. Each control shaft is further connected with a controllable locking and unlocking rod for freeing or holding back the control shaft for a specific blade and all the control shafts together with their springs form emergency releases that let the blades pivot back when struck by a foreign object, such as a rock pulled into the chopper.

Here the disadvantage is that the cutting blades even when freed by their supports remain in the active cutting position because they are held in place by wet crop and miscellaneous foreign matter. The mechanism is rather bulky with its control shafts surrounded by coil springs so as to form a solid wall of structure behind the blades that fills with foreign matter and generally blocks access to the blades. Since the pivoting mechanism for the transverse beam carrying the control shafts is relatively tall, the ground clearance of this machine is also reduced excessively.

OBJECTS OF THE INVENTION

It is therefore an object of the present invention to provide an improved chopper for an agricultural machine.

Another object is the provision of such an improved chopper for an agricultural machine which overcomes the above-given disadvantages, that is which is simple and where the blade positions can be surely set and reset by means of an uncomplicated structure.

SUMMARY OF THE INVENTION

A crop chopper for an agricultural machine has according to the invention a frame defining a crop-throughput passage, a rotor on the frame having a plurality of fingers displaceable on rotation of the rotor along the passage, and respective blades interleaved with the fingers and each having a front end pivoted about a horizontal axis on the frame and a rear edge formed with a rearwardly open notch so that crop pressed by the fingers between the blades is chopped and moved rearward along the passage. A rocker is pivotal about a horizontal axis on the frame and respective actuator plates juxtaposed with the rear edges of the blades are each formed with a rearwardly projecting arm. Respective abutment bodies on the plates are displaceable toward and away from the respective blades and respective springs braced between the bodies and the respective plates urge the bodies forward toward the blades. The plates are each pivotal about a horizontal axis on the frame between an active position with the respective body engaged against the respective rear edge and an inactive position with the respective body disengaged from the respective rear edge. Respective springs braced between the plates and the rocker pivot the plates on the rocker about the respective plate axis in a direction pulling the bodies away from the blades and pivot the blade arms downward. An abutment beam extends on the frame below the plates, and at least one actuator engaged between the rocker and the frame can pivot down the rocker and thereby press the rear arms against the abutment beam and bring the plates into the active positions.

Thus with this system pushing down the rocker brings the arms of the actuator plates into contact with the actuator beam to set them all in the same position. Then interengaging formations on the plates and rocker can be used to arrest selected ones of the plates in the active position while leaving the remaining plates to pivot back into the inactive positions on lifting of the plates off the abutment beam. As a result the actuator-plate structure can be very small and simple.

According to the invention the formations include a set of holes formed in the rocker, holes and slots formed in the plates and alignable in the active position, and at least one control rod insertable through the rocker holes and through the holes and slots of the plates for arresting selected plates in the active positions. More particularly the set of holes includes offset circular lower, middle, and upper holes on the rocker. Some of the plates are formed with middle circular holes alignable with the middle rocker holes and others of the plates are formed with middle arcuate slots alignable with the middle rocker holes. Others of the plates are formed with upper circular holes alignable with the upper rocker holes and yet others of the plates are formed with upper arcuate slots alignable with the upper rocker holes. All of the plates are formed with a lower circular holes alignable with the lower rocker holes.

The various pivot axes are all substantially parallel. In addition the rocker includes a pair of arms having inner ends pivoted about the rocker axis on the frame and outer ends and a beam extending parallel to the rocker axis and bridging the outer arm ends. The blades are held in respective upwardly open U-shaped guides fixed on the frame and each receiving a respective blade and having a floor against which the blade rests in a retracted position remote from the rotor. The abutment beam is provided with a pair of length-adjustable arms fixedly connecting it to the frame so that the position of the abutment beam on the frame can be adjusted.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
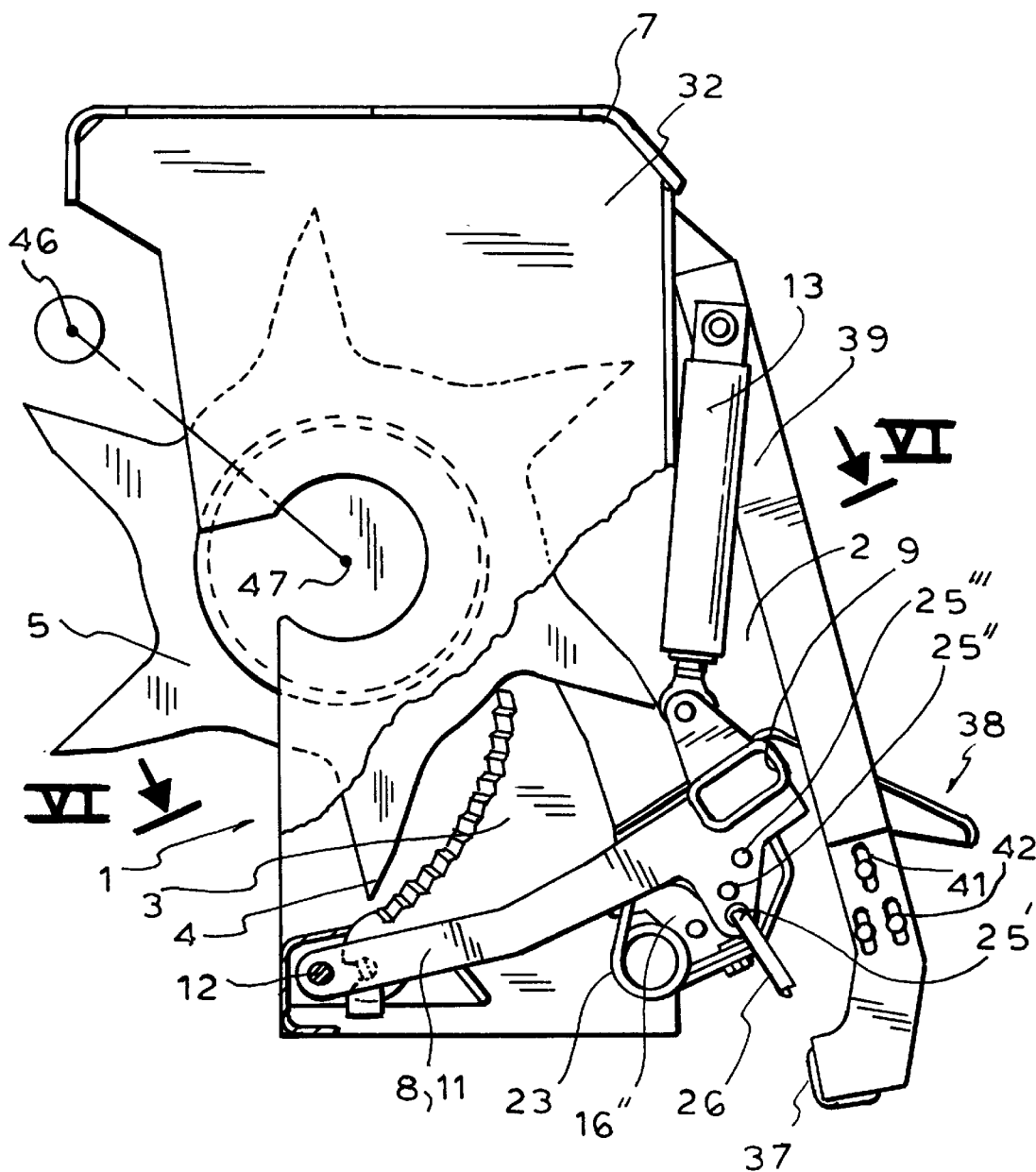
FIG. 1 is a vertical section through the chopper according to the invention, taken along line I—I of FIG. 6.
Figure 2:
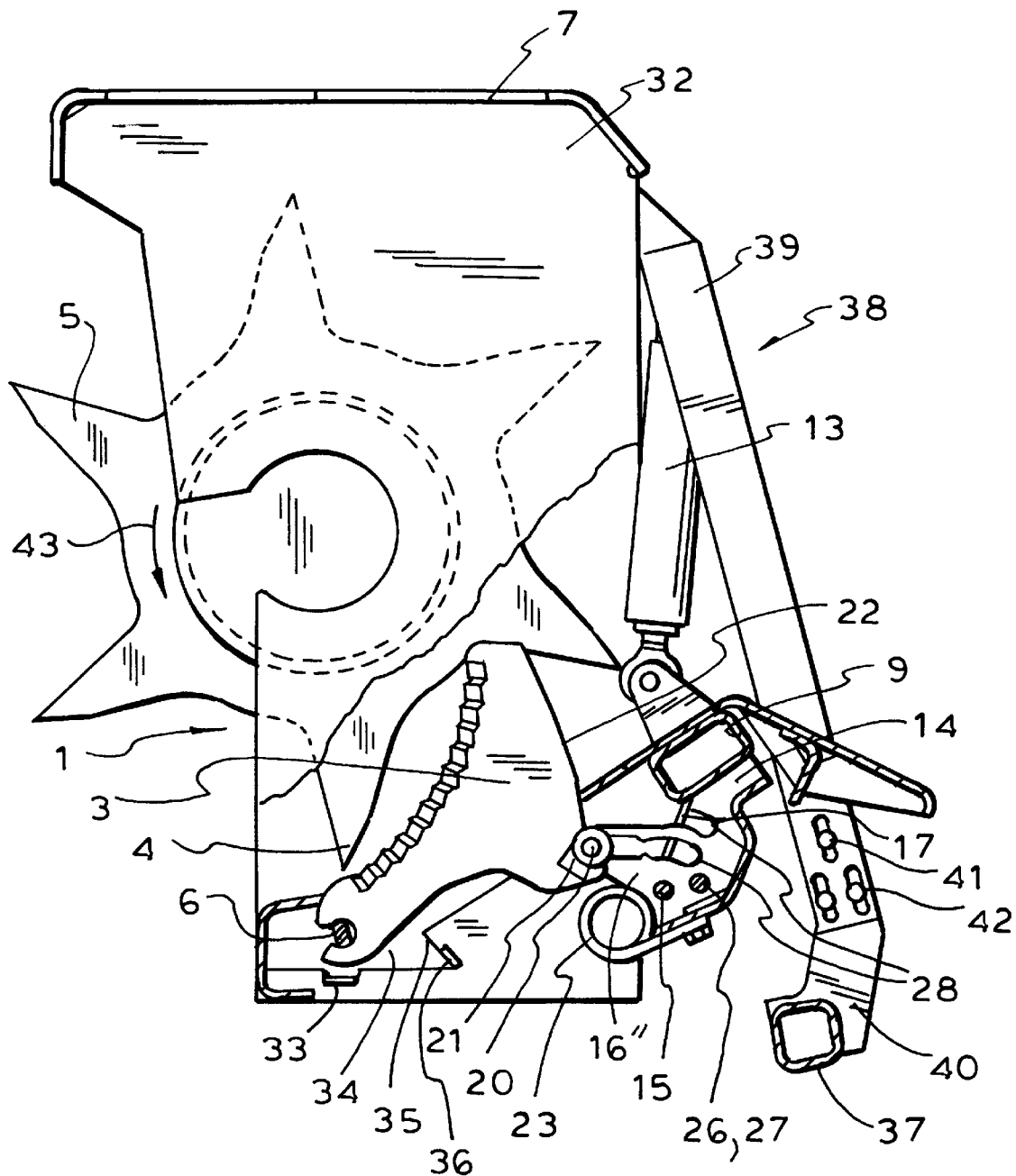
FIG. 2 is a vertical section through the chopper with the blades all in the active or service position, taken along line II—II of FIG. 6.

As seen in FIGS. 1 through 6, a chopper 1 according to the invention has a frame 7 defining a passage 2 along which crop is fed in a direction D normally from a cutting implement (e.g. a sickle bar) and feed augers on the front of a combine or the like incorporating the chopper 1. A plurality of parallel and horizontally spaced flat blades 3 each lying in a vertical plane are supported on the frame 7, interleaved with rotary feed plates forming a rotor 5 and having fingers 4 that extend between serrated front cutting edges 43 of these blades 3. A drive indicated schematically at 46 rotates the rotor 5 about its axis 47 in a counter clockwise direction to move the incoming crop along the passage 2. Thus as the crop is pushed by the fingers 4 between the blades 3 these edges 43 it will be chopped.

Each blade 3 is held in a respective upwardly open guide 33 forming a lower abutment 34 and having a slot 35 against a floor 36 of which the blades 3 can engage. Furthermore, each blade 3 is pivoted at its front end on a shaft 6 fixed in the frame 7 and has a rear edge 22 formed at its lower end with a rearwardly open semicircular cutout or notch 21. Each rear edge 22 is further from the axis 6 at its upper end than at its lower end.

A rocker frame 8 has a horizontal rectangular-section beam 9 extending behind the rotor 5 and supported via arms 10 and 11 pivotal about a horizontal axis 12 on side plates 32 of the frame 7. A pair of upright hydraulic cylinders 13 allow the rocker 8 and its beam 9 to be moved from the upper position of FIGS. 1, 2, and 4 to the lower position of FIG. 3.

Figure 7:
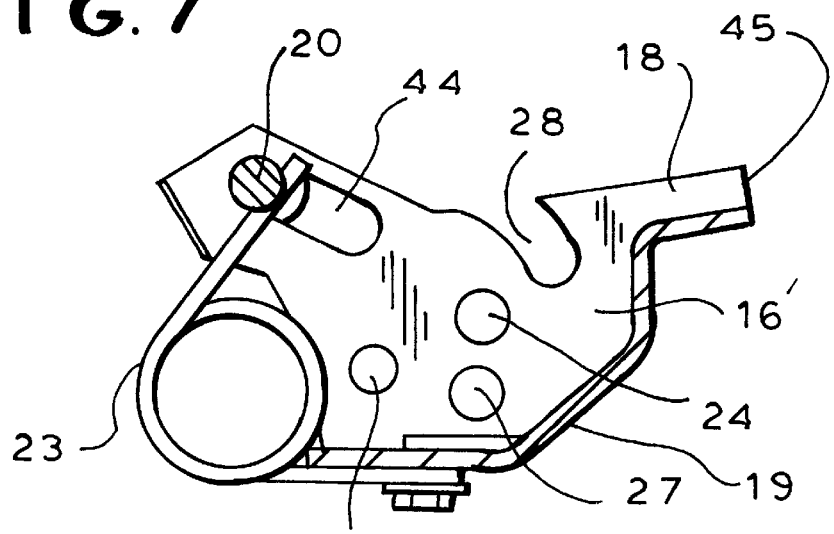
FIGS. 7, 8, and 9 are large-scale side views of actuator plates according to the invention.
Figure 8:
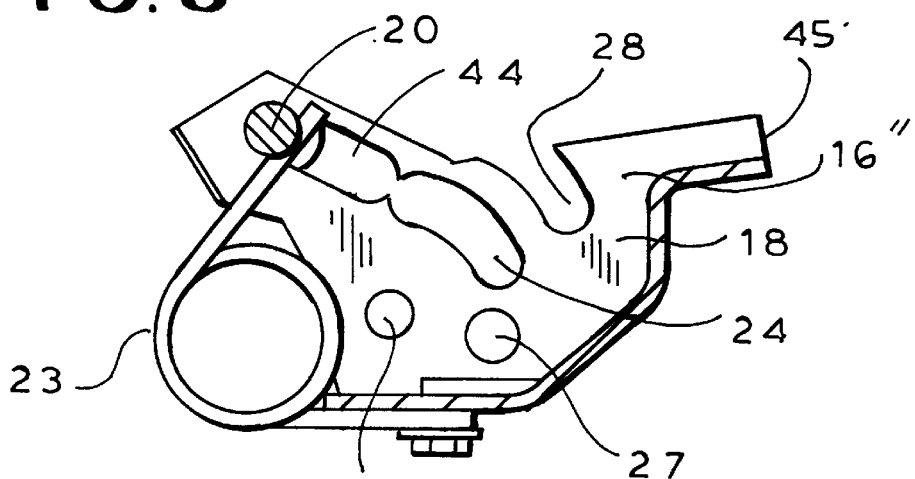
Figure 9:
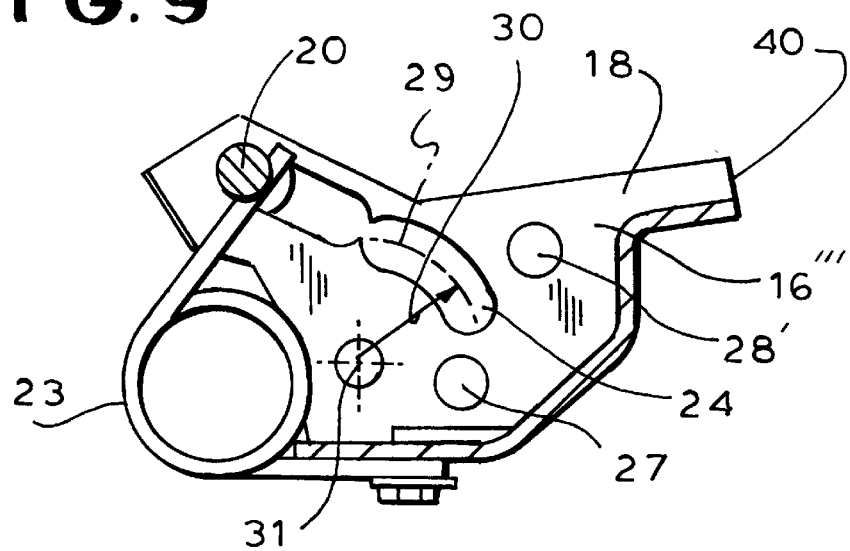

Respective retaining plates 16', 16", and 16''' shown in better detail in FIGS. 7 through 9 are of U-shape, each having a pair of vertical and parallel side plates 18 and a horizontal web 19 bridging their lower edges. The plates 16', 16", and 16''' are pivoted on a rod 15 extending the full width of the machine and extending between holders 14 fixed on the beam 9, with each plate 16', 16", and 16''' being positioned immediately behind a respective one of the blades 3. Respective pins 20 are limitedly movable in slots 44 in these side plates 18 so that they can slide therein. Springs 23 urge them into forward positions in which they either fit in the respective blade cutout 21 or bear against the respective blade rear edge 22. Respective torque springs 17 engaged around the rod 15 urge the plates 16', 16", and 16''' clockwise about the rod 15 so that if not restrained they pivot down away from the beam 9, pulling the respective roller pin 20 out of the respective notch 21.

Each plate 16' as shown in FIG. 7 is formed with a lower hole 27, a middle hole 24', and an upper slot 28. Each plate 16" (FIG. 8) has an identical such lower hole 27, a central slot 24, and an upper slot 28. Each plate 16''' (FIG. 9) has the same lower hole 27, a central slot 24, and an upper hole 28'. The slots 24 each have a centerline 29 having a radius 30 extending from an axis 31 of the shaft 15 on which the respective plate 16', 16" or 16''' and the slots 28 are similarly centered. In addition each plate 16', 16", and 16''' has a rearwardly extending arm 45 which can flatly engage an abutment beam 37 carried at the lower end of two upright arms 38 having upper ends fixed to the side plates 32 of the frame 7. These arms 38 each have an upper section 39 that telescopes in a lower section 40 and the sections 39 and 40 are formed with through-going slots 41 through which bolts 42 extend to adjust the length of the arms 38 and thereby set the rest position of the plates 16', 16", and 16'''.

When the actuators 13 are extended to pivot down the rocker 8, all of the arms 45 are pressed against the beam 37 and the holes 27 are aligned with holes 25' in the arms 10 and 11. Similarly the slots 24 and holes 24' are aligned with further holes 25 " in these arms 10 and 11 and the holes 28' and slots 28 are aligned with further holes 25''' in these arms 10 and 11. Thus it is possible to insert rods 26 or 26' through the aligned holes and arrest some or all of the plates 16', 16", 16''' against rotation, leaving the others to rotate. Normally one of the rods 26 is inserted through the arm 10 and the other rod 26' through the arm 11.

Figure 3:
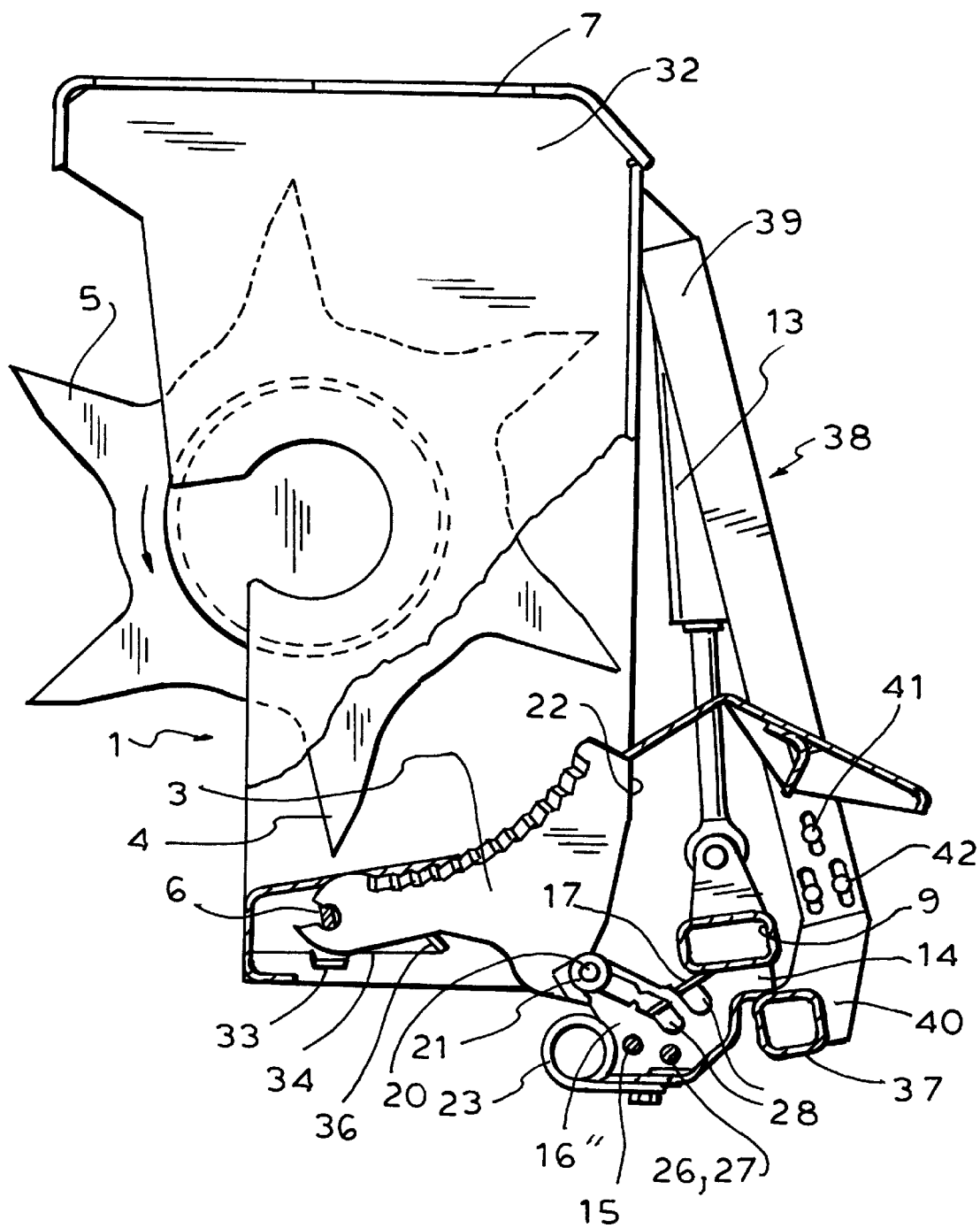
FIG. 3 is a view like FIG. 2 but with the blades all in the retracted inactive position.
Figure 4:
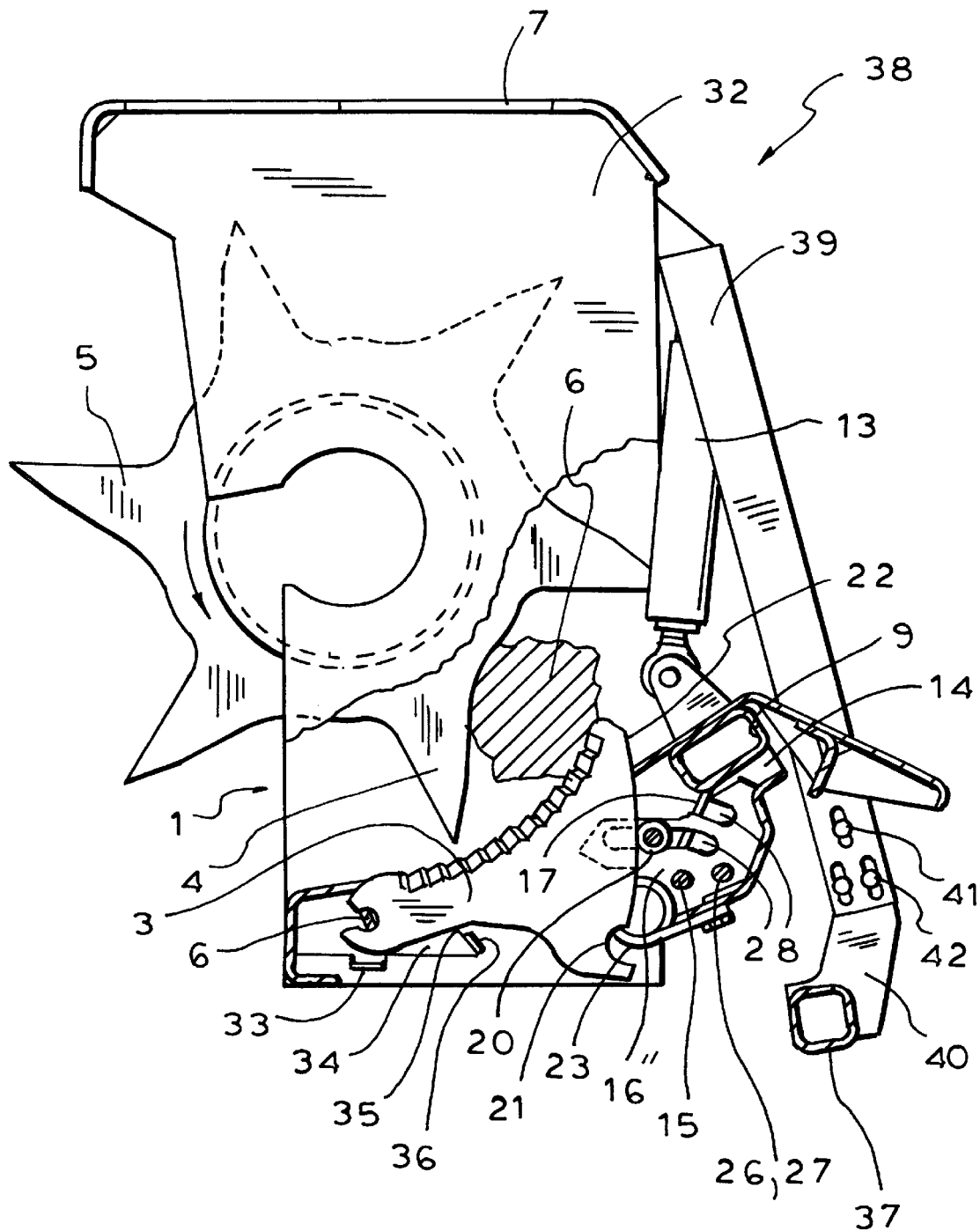
FIG. 4 is a view like FIG. 2 but with a blade deflected by a foreign object.
Figure 5:
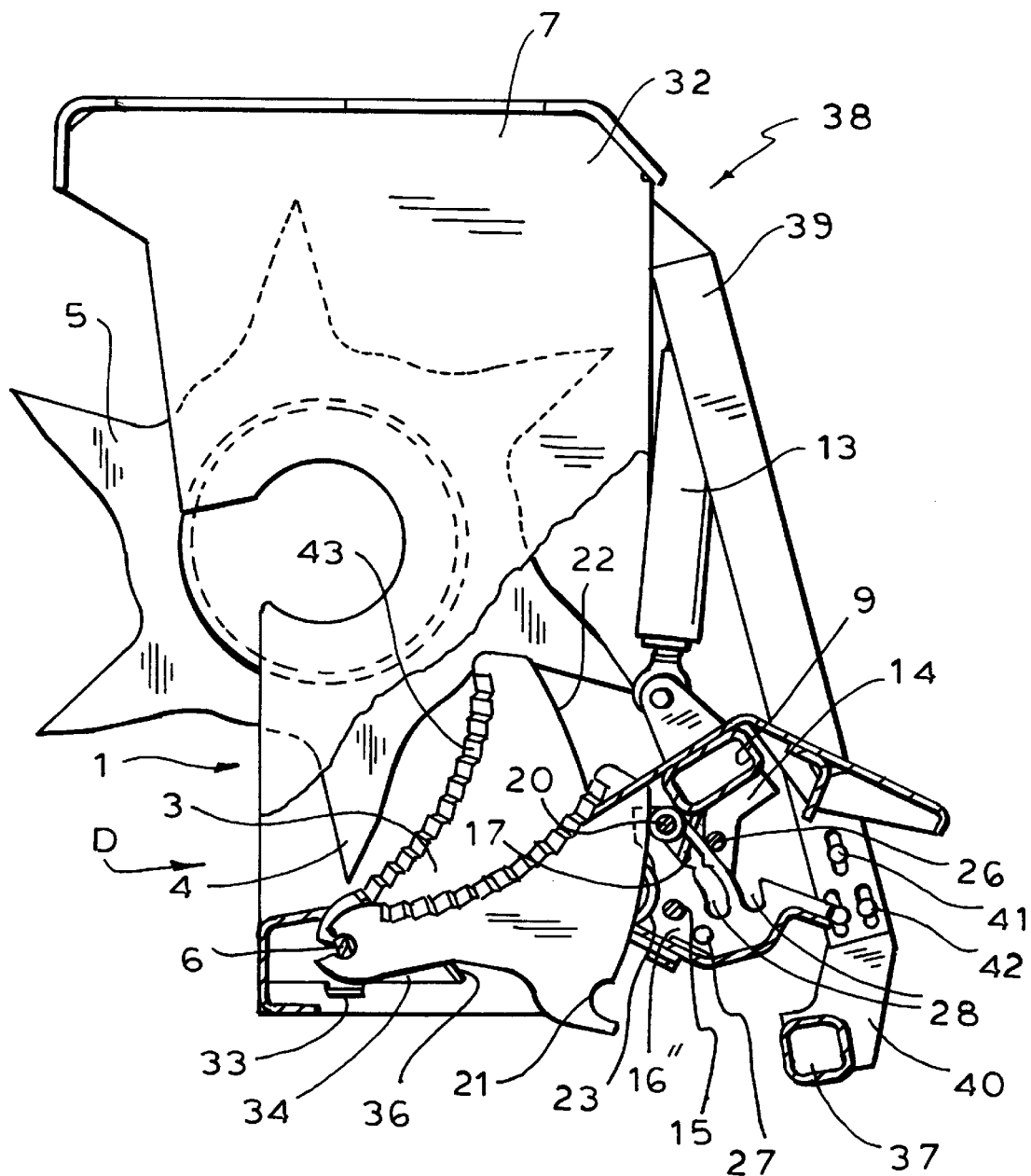
FIG. 5 is a view like FIG. 2 but with some blades retracted and some blades advanced.
Figure 6:
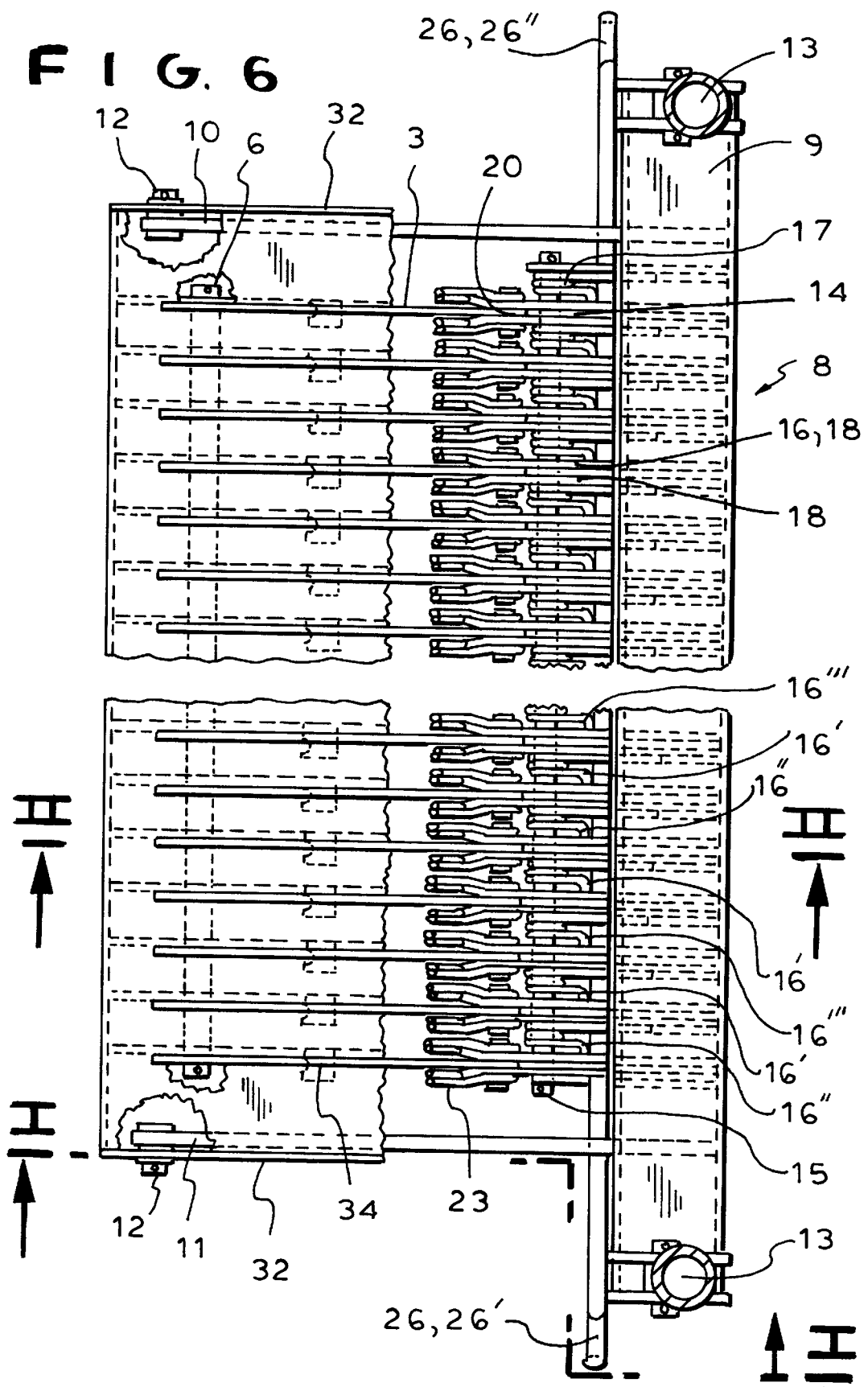
FIG. 6 is a generally horizontal section taken along line VI—VI of FIG. 1.

From one end of the chopper 1, plates 16' alternate with plates 16" and 16''', that is every other position is occupied by a plate 16' with intervening positions alternately occupied by the plates 16" and 16'''. Thus if rods 26' or 26" are inserted through the holes 25' and 27, all of the plates 16', 16", and 16''' will be arrested and the crop will be cut to the shortest possible length. Similarly, inserting control rods 26 and 26' through various combinations of the holes 25', 25", and 25''' as well as through the intervening holes 24', 27, and 28 and slots 24 and 28 allows various combinations of plates 16', 16", and 16''' to be allowed to pivot back out of the way, releasing the respective blades as shown in FIGS. 3 and 5 to drop back out of the way and increasing chopping length. Of course as shown in FIG. 4, if a large object 6 rides through the chute 2 it will force back some of the blades 3 with such force that they cam the respective pins 20 out of the notches 21 and rotate back into the inactive position. Since the rear edge 22 is not an arc centered on the pivot 6, but instead runs out from the bottom to the top so that once the object O is out of the way, the force of the spring 23 will tend to cam the blade 3 back up into its active position.

Thus to set the number of blades 3, the cylinders 13 are extended to rotate down the rocker 8 and simultaneously press all the rear blade arms 45 against the abutment 37, bringing all the plates 16', 16", and 16''' into alignment. During this movement, any blades 3 that are already in the out-of active position, that is resting on the abutment 34 with the respective pins 20 riding on the respective rear edges 22, will be reconnected as the pins 20 are moved down and snap into the notches 21, reaching the position of FIG. 3. Then the control rods 26 and 26' are appropriately inserted to select the desired array of plates 16', 16", and 16''' and the actuators 13 are then shortened to pull the selected plates 16', 16", and/or 16''' back up into position while leaving some of them down.

I claim:

1. A crop chopper for an agricultural machine, the chopper comprising:

a frame defining a crop-throughput passage;

a rotor on the frame having a plurality of fingers displaceable on rotation of the rotor along the passage;

respective blades interleaved with the fingers and each having a front end pivoted about a horizontal blade axis on the frame and a rear edge formed with a rearwardly open notch, whereby crop pressed by the fingers between the blades is chopped and moved rearward along the passage;

a rocker pivotal about a horizontal rocker axis on the frame;

respective actuator plates juxtaposed with the rear edges of the blades and each formed with a rearwardly projecting arm;

respective abutment bodies on the plates displaceable toward and away from the respective blades;

respective springs braced between the bodies and the respective plates for urging the bodies forward toward the blades, the plates being pivotal about a horizontal plate axis on the frame between an active position with the respective body engaged against the respective rear edge and an inactive position with the respective body disengaged from the respective rear edge;

respective springs each braced between a respective one of the plates and the rocker for pivoting the plates on the rocker about the plate axis in a direction pulling the bodies away from the blades and pivoting the blade arms downward;

an abutment beam extending on the frame below the plates; and means including at least one actuator engaged between the rocker and the frame for pivoting down the rocker and thereby pressing the rear arms against the abutment beam and bringing the plates into the active positions.

2. The agricultural-machine crop chopper defined in claim 1, further comprising means including interengaging formations on the plates and rocker for arresting selected ones of the plates in the active position while leaving the remaining plates to pivot back into the inactive positions on lifting of the plates off the abutment beam.

3. The agricultural-machine crop chopper defined in claim 2 wherein the formations include a set of holes formed in the rocker, holes and slots formed in the plates and alignable in the active position, and at least one control rod insertable through the rocker holes and through the holes and slots of the plates for arresting selected plates in the active positions.

4. The agricultural-machine crop chopper defined in claim 3 wherein the set of holes includes offset circular lower, middle, and upper holes on the rocker, some of the plates being formed with middle circular holes alignable with the middle rocker holes and others of the plates being formed with middle arcuate slots alignable with the middle rocker holes, others of the plates being formed with upper circular holes alignable with the upper rocker holes and others of the plates being formed with upper arcuate slots alignable with the upper rocker holes.

5. The agricultural-machine crop chopper defined in claim 4 wherein all of the plates are formed with a lower circular holes alignable with the lower rocker holes.

6. The agricultural-machine crop chopper defined in claim 1 wherein the axes are all substantially parallel.

7. The agricultural-machine crop chopper defined in claim 1 wherein the rocker includes a pair of arms having inner ends pivoted about the rocker axis on the frame and outer ends and a beam extending parallel to the rocker axis and bridging the outer arm ends.

8. The agricultural-machine crop chopper defined in claim 1, further comprising respective upwardly open U-shaped guides fixed on the frame and each receiving a respective blade and having a floor against which the blade rests in a retracted position remote from the rotor.

9. The agricultural-machine crop chopper defined in claim 1 wherein the abutment beam is provided with a pair of length-adjustable arms fixedly connecting it to the frame, whereby the position of the abutment beam on the frame can be adjusted.

* * * * *